(12) United States Patent
Lin et al.

(10) Patent No.: US 10,956,639 B1
(45) Date of Patent: Mar. 23, 2021

(54) METHOD TO REDUCE FULL-CHIP TIMING VIOLATION THROUGH TIME BUDGETING IN INTEGRATED CIRCUIT DESIGN

(71) Applicants: Yizhou Lin, Santa Clara, CA (US); Jian Tang, Austin, TX (US); Hongchang Liang, Austin, TX (US)

(72) Inventors: Yizhou Lin, Santa Clara, CA (US); Jian Tang, Austin, TX (US); Hongchang Liang, Austin, TX (US)

(73) Assignees: ARCADIA INNOVATION INCORPORATED, Santa Clara, CA (US); HYGON INFORMATION TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 16/731,484

(22) Filed: Dec. 31, 2019

(51) Int. Cl.
*G06F 30/3312* (2020.01)
*G06F 30/337* (2020.01)
*G06F 119/12* (2020.01)

(52) U.S. Cl.
CPC ........ *G06F 30/3312* (2020.01); *G06F 30/337* (2020.01); *G06F 2119/12* (2020.01)

(58) Field of Classification Search
CPC .. G06F 30/327; G06F 30/337; G06F 30/3312; G06F 30/3315; G06F 30/396; G06F 2219/12; G06F 30/373

USPC .................................................. 716/108, 113
See application file for complete search history.

(56) References Cited

U.S. PATENT DOCUMENTS

| | | | | |
|---|---|---|---|---|
| 2003/0110462 A1* | 6/2003 | Cohn | .................... | G06F 30/327 |
| | | | | 716/113 |
| 2008/0168412 A1* | 7/2008 | Cheon | .................... | G06F 30/394 |
| | | | | 716/114 |
| 2012/0284680 A1* | 11/2012 | Iyer | ..................... | G06F 30/3312 |
| | | | | 716/113 |

* cited by examiner

*Primary Examiner* — Paul Dinh
(74) *Attorney, Agent, or Firm* — Loeb & Loeb LLP

(57) ABSTRACT

A method of time budgeting an integrated circuit (IC) that includes determining an initial value of time delay variables for each block of a plurality of blocks along a set of timing paths based on delays of each design module of the blocks and determining a value of at least one advanced timing factor adjusting a clock period of the IC along each timing path. The method then generates a time budget for ports along each timing path based on the value of the at least one advanced timing factor and the initial value of the time delay variable. The method then optimizes the value of time delay variables by calculating new values of the time delay variables that satisfy each timing path to minimize a possibility of timing violations and to satisfy the clock period of the IC, which is adjusted by the value of the advanced timing factor.

11 Claims, 5 Drawing Sheets

METHOD TO REDUCE FULL-CHIP TIMING VIOLATION THROUGH TIME BUDGETING IN INTEGRATED CIRCUIT DESIGN

BACKGROUND

The exemplary embodiments generally relate to reducing timing violation by time budgeting for components of a semiconductor integrated circuit (IC) in the design and manufacturing of the IC.

An IC includes a large number of electronic components that are manufactured on a substrate by forming layers of different materials and of different geometric shapes. The design of ICs continues to evolve, which increases the complexity and time required for design and manufacturing of ICs. Further, manufacturing technology continues to decrease the size of components, which allows a larger number of functions to be incorporated on a single IC. IC designers are capable of creating systems of components on an IC that are increasingly more complex, robust, and require a high-level design language in order to construct, verify, and test the IC.

Electronic design automation (EDA) systems are software used to aid a designer in design of an IC. For complex ICs, the physical layout and design of an IC is divided into multiple functional blocks with a plurality of levels of hierarchy, and each of the blocks may correspond to the same design module or different design modules. A design module is a functional partition of a full IC design that describes a function of the block according to the electronic components installed in the block. For example, an EDA system may receive descriptions and parameters of the IC device defining interconnections of nodes and components on the IC, and includes multiple types of physical information of circuit components. Time budgeting derives input and output delay constraints along with path exceptions for the timing closure of the blocks or partitions, enabling the timing closure of all the blocks simultaneously.

An integrated circuit designer may use the EDA system to create a physical integrated circuit design layout from a logical circuit design of the IC. The EDA system uses geometric shapes of different materials to design a layout of the various electrical components on a substrate. Upon creating an initial integrated circuit layout, a designer then analyzes and optimizes the IC layout using the EDA system.

One function of an EDA system is to determine whether the IC design meets timing requirements along signal paths in the design. Failure of a design to adequately meet timing requirements could result in the IC failing during use and/or not properly functioning for its intended purpose. Thus, for design purposes, it is important for designers to be able to accurately confirm that an IC design will satisfy its timing requirements.

Time budgets are defined for each port of a block on the IC along a timing path. A time budget derives a timing constraint of a block from the timing constraint of the full IC design. Time budgeting is a necessary step for large IC design, which uses algorithms to distribute time period requirements to each input port and output port of each block of the IC.

There are prior methods for performing time budgeting. One example of a relevant prior method for performing time budgeting was to convert the full chip design into a directed acyclic graph (DAG), and use algorithms to determine a timing specification for the input and output ports of each block in the IC design. The timing specifications of the blocks are different from each other, and thus required the implementation of each timing specification for each block to be determined individually to meet the timing requirement of the entire IC design.

However, as the complexity of designing integrated circuits continues to increase, there is the need to improve the efficiency and accuracy of the time budgeting of the design in order to minimize the possibility of fill-chip timing violations. In particular, the increased complexity of integrated circuits also increases the number of factors or variables that effect the timing requirements of the full IC design.

SUMMARY

The exemplary embodiments provide a path-based method of time budgeting an IC that is divided into multiple blocks to reduce full-chip timing violations by accounting for advanced timing factors.

The exemplary embodiments implement a time budgeting process during the IC design phase that incorporates additional time-relevant or delay-relevant factors into the time budgeting algorithms. Time budgeting methods distribute timing delays relative to the different input and output ports of each block. Using a path-based approach for time budgeting, the exemplary embodiments improve upon the conventional methods by incorporating advanced timing factors/parameters into a time budgeting algorithm to distribute timing constraints along a timing path over the entire IC design (i.e., full chip design) to meet the clock (time) period requirements for the entire IC. The path-based approach performs time budgeting for the full IC for each port along a timing (signal) path through the full IC to meet the timing requirement (clock period or clock cycle) of the full IC. By using this top-level/full-chip approach, and by using a path dependent time budgeting, the exemplary embodiments more accurately determine the time budgeting of the full chip to meet the time period requirements and minimize full-chip timing violations, as discussed in more detail below.

Further, the exemplary embodiments increase the accuracy and efficiency of the design process, and reduce the engineer workloads and computational resource machine (computer) requirements by reducing the amount of post-design modifications to the time budget during a timing analysis phase in light of the increased accuracy of the design developed during the design process. As discussed in more detail below, time budgeting of the blocks in the IC affects the physical design/implementation of the components of the blocks when manufactured. Thus, the more accurate time budgeting performed by the exemplary embodiments during the design process also affects the physical implementation of the blocks when the IC is manufactured.

In the above-mentioned example of the prior methods, the timing specification for the input and output ports of each block was determined and then summed for all blocks within the IC to determine compliance with a clock period of the full IC. This method is known as a clock-based method. This clock-based method determines a clock cycle, or multiple clock cycles, for the IC. Timing variables of each block are determined based on the physical implementation/layout of the components within the block and the time constraints of each of the components. Values of the timing variables are then determined to ensure that the sum of all timing constraints, including the timing variables, for all blocks of the IC is less than or equal to the clock period for the full IC.

This conventional approach may have been practical in the past for simple designs. However, as the complexity and number of components increases in ICs, the conventional approach is both inaccurate and a waste of engineering and computational resources for current and future ICs. The conventional approach oversimplified the time budgeting process, which created a greater likelihood of timing violations once the IC is manufactured. A timing violation occurs when actual timing for a signal to pass through an IC exceeds the clock period assigned to the IC. In other words, when the sum of the time constraints of all the blocks fails to meet the time constraint to the full IC, a timing violation has occurred.

Once a design for an IC is complete, a time analysis is performed to determine whether the physical IC achieves the necessary timing requirements for the IC set forth in the design. The physical IC is tested using known timing analysis techniques to determine whether any timing violations exist. If a timing violation exists, the IC may need to be modified or redesigned, which causes increased time until a final product is ready, and a waste of engineering and computational resources.

In order to solve these problems in the prior methods, the exemplary embodiments set forth a method, device, and non-transitory computer readable medium for time budgeting an integrated circuit (IC) that includes determining an initial value of time delay variables for each block of a plurality of blocks of the IC along a timing path based on delays of each design module of the plurality of blocks and determining a value of at least one advanced timing factor adjusting a clock period of the IC along the timing path. The method then generates a time budget for ports along the timing path based on the value of the at least one advanced timing factor and the initial value of the time delay variable. The method then optimizes the value of time delay variables by calculating new values of the time delay variables to minimize a possibility of timing violations and to satisfy the clock period of the IC, which is adjusted by the value of the advanced timing factor.

The advanced timing factors incorporated into the improved time budgeting algorithm of the exemplary embodiments may include, for example, clock skew, common path pessimism removal (CPPR), data cell variation, signal integrity (SI), etc.

The exemplary embodiments provide improved time budgeting by incorporating additional time-relevant or delay-relevant factors (advanced timing factors) into the time budgeting algorithms to distribute timing constraints along a timing path to meet the time period requirements for the entire IC using a path-based approach. Importantly, the exemplary embodiments reduce or minimize the possibility of timing violations during timing analysis of the IC design.

DETAILED DESCRIPTION

Figure 1:
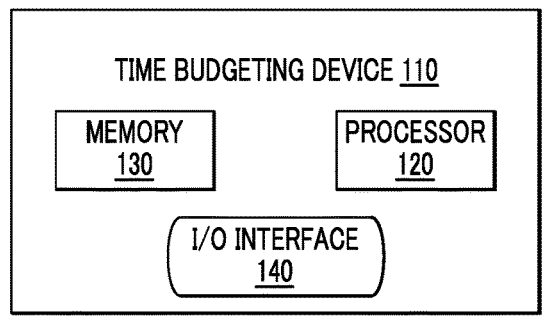
FIG. 1 illustrates a block diagram of an exemplary time budgeting device for path-based time budgeting of an IC according to an exemplary embodiment.

The exemplary embodiments relate to time budgeting of clock signal timing of IC design. FIG. 1 is a block diagram illustrating a time budgeting device 110 that may be configured as one or more computers including one or more processors 120, one or more storage devices 130, and an input/output (I/O) interface 140. The one or more processors 120 may be any type of programmed computational device, including central processing units (CPU), microprocessors, microcontrollers, networked computer systems, etc., or a specialized processor for performing integrated circuit design. The one or more storage devices 130 may be a computer readable storage medium that includes memory devices, storage media readable by a removable media drive, and/or a hard disk drive, such as random access memory (RAM), read-only memory (ROM), magnetic hard disks, optical storage discs, etc., for storing one or more software modules of instructions that control the processor 120 to perform various operations.

The I/O interface 140 allows a user to input to and receive data from the processor 120. The I/O interface 140 also allows control of the various operations performed by the processor 120. For example, the I/O interface 140 may comprise one or more input devices, such as a keyboard, a pointing device (e.g., a mouse, a track ball), a touch-sensitive display, microphone, etc. The I/O interface 140 may also comprise one or more output devices, such as a display (including a touch-sensitive display).

Figure 2:
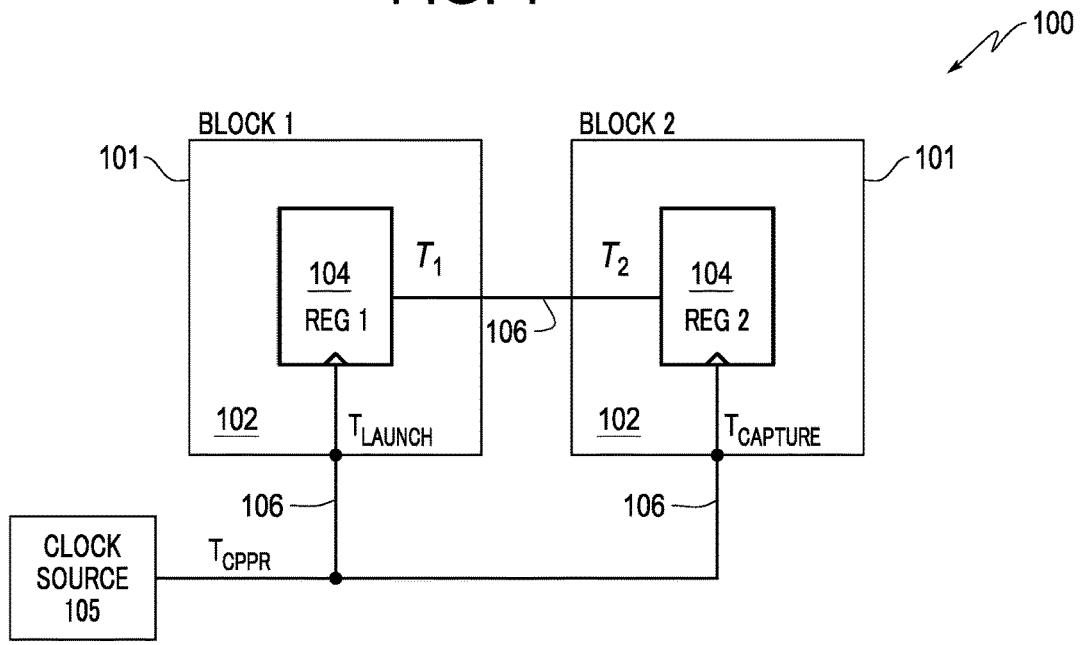
FIG. 2 illustrates an example of a full IC having two blocks according to an exemplary embodiment.

As shown in FIG. 2, a full integrated circuit (IC) 100 is partitioned into, for example, two functional blocks 101 of various electronic components (not shown). The blocks 101 partitioning the IC 100 into different regions perform functions according to the electronic components within each block 101.

Figure 3:
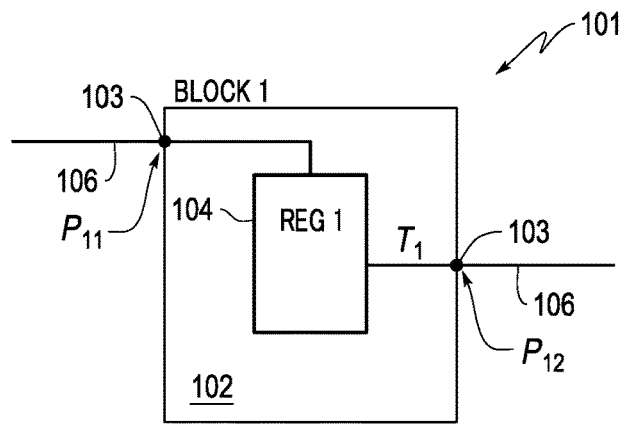
FIG. 3 illustrates an example of a block of the IC with internal and external delays of ports of the IC according to an exemplary embodiment.

The exemplary embodiments are used to design an integrated circuit, such as IC 100. IC 100 may be depicted in multiple different manners, such as a flattened chip or a tree hierarchy of different levels of circuits. For example, FIGS. 2 and 3 show the IC 100 as a flattened chip for illustrative purposes, but IC 100 is not limited to this configuration.

Time budgeting is a part of the block implementation in the design of the IC 100 that allows for generating of timing and physical constraints for each partition (e.g., design module, block, etc.).

The exemplary embodiments are directed to budgeting of clock signal timing of an IC design for time budgeting of the blocks 101 of the IC 100 in order to satisfy a predetermined time budget (clock period). Time budgeting divides the time for a data signal to propagate along a timing path extending between different blocks 101 of the IC 100. The exemplary embodiments provide improved time budgeting by performing time budgeting for the full IC 100. As discussed in further detail herein, this improved time budgeting device and method implements a time budgeting algorithm that increases the accuracy and efficiency of the design process, and results in a final design of the IC chip where the timing requirements for the full IC are satisfied while minimizing the possibility of timing violations by accounting for advanced timing factors using a path-based approach.

The advanced timing factors incorporated into the improved time budgeting algorithm of the exemplary embodiments may include, for example, clock skew, common path pessimism removal (CPPR), data cell variation, signal integrity (SI), etc., which are discussed in more detail below.

FIG. 2 is a block diagram illustrating the IC 100 that is partitioned into the two functional blocks 101 of electronic components. Each block 101 is a physical instantiation of a design module 102, which is a functional partition of the IC 100. The design module 102 defines the function behavior of the electronic components within the block 101. The design module 102 may have one or multiple physical realizations in the IC. Each block 101 has a different design module 102, or alternatively, the full IC 100 may have multiple design modules 102 that are identical, which is known as multi-instantiation.

Each block 101 is defined by one or more ports 103 ($P_{11}$-$P_{12}$), as shown in FIG. 3. For example, the ports 103 are located on a first side as input ports to receive incoming signals to the block 101, and on a second side as output ports where the outgoing signals are transmitted from each block 101. The ports 103 have connected elements that are initially located at specified positions relative to the ports 103 of each block 101. The location of each port 103 and connected element in a final design of the IC 100 identifies the physical location of each port 103 and connected element on the IC 100 when manufactured using an integrated circuit manufacturing and/or fabrication tool(s).

As shown in FIG. 2, at least one timing path 106 connects between the different blocks 101, or components and blocks 101, of the IC 100. The timing path 106 indicates a signal that propagates between the ports 103 of the different blocks 101. The timing path 106 may be configured to connect between varieties of different blocks 101 depending on the configuration of electronic components on the IC 100.

The timing path 106 may be sub-divided into multiple segments of the timing path. For example, using the IC 100 shown in Figure, the timing path 106 is divided into three paths: (i) a launch path extending from a clock source 105 to Block 1, (ii) a capture path extending from the clock source 105 to Block 2, and (iii) a data path extending between a register (Reg1) 104 of Block 1 and a register (Reg2) 104 of Block 2.

The time budgeting, as discussed herein, determines an optimal value of time delay variables $T_1/T_2$ along the timing path 106 to meet the clock period requirements of the IC 100 in order to distribute the time budget to the ports 103 located along the timing path 106.

The time delay variables $T_1/T_2$ must be set so that a clock period of the IC 100 is equal to or larger than the time delays along the timing path 106 in order for the IC 100 to function properly, where the signal(s) along the timing path has/have sufficient time to propagate through the IC 100. As discussed in more detail below, the time budgeting of the exemplary embodiments analyzes the time delay variables $T_1/T_2$ and any applicable advanced timing factor(s) and then optimizes the values of the time delay variables $T_1/T_2$ to meeting the clock period requirement of the full IC 100. The values of any applicable advanced timing factor(s) are determined based on the timing path 106, and then the values of the time delay variables $T_1/T_2$ are optimized (changed) to be as close as possible to the clock period of the IC 100.

The position of the connected elements and/or the ports 103 are based on the value of the time delay variables $T_1/T_2$. Time budgeting algorithms distribute timing requirements for delays relative to each port 103 of the IC 100. The timing requirement could be in various formats, such as one clock period, half of a clock period, or multiple clock periods.

Importantly, as recognized by the inventors, the time delay variables $T_1/T_2$ and the clock period for the full IC 100 are affected by advanced timing factors, which are parameters that affect the timing of signals propagating through the blocks 101 and the full IC 100. Thus, it is important to optimize the time budgeting of the IC 100 while also accounting for any and all advanced timing factors in order to ensure accurate optimization of the time delay variables $T_1/T_2$ resulting in proper functioning of the IC 100. This reduces the likelihood or possibility of timing violations.

Method of Time Budgeting an Integrated Circuit (IC)

FIGS. 4-7 illustrate flowcharts explaining exemplary steps of a method of time budgeting IC 100 that account for different advanced timing factors using a path-based approach. The method may include fewer or additional steps than the exemplary embodiments set forth herein. In addition, the different advanced timing factors may be considered individually, or some or all may be combined in any combination, depending on the applicable advanced timing factors for a particular timing path 106 or the IC 100. For exemplary purposes only, the following explanation will address each exemplary advanced timing factor individually for timing path 106.

The following methods of the exemplary embodiments describe methods that include overlapping steps. As specified below, for the purpose of conciseness, the details of the overlapping steps are not repeated for each exemplary embodiment. As discussed in more detail below, each exemplary embodiment relates to a time budgeting algorithm that accounts for a different advanced timing factor as specified below.

Advanced Timing Factor—Clock Skew

Figure 4:
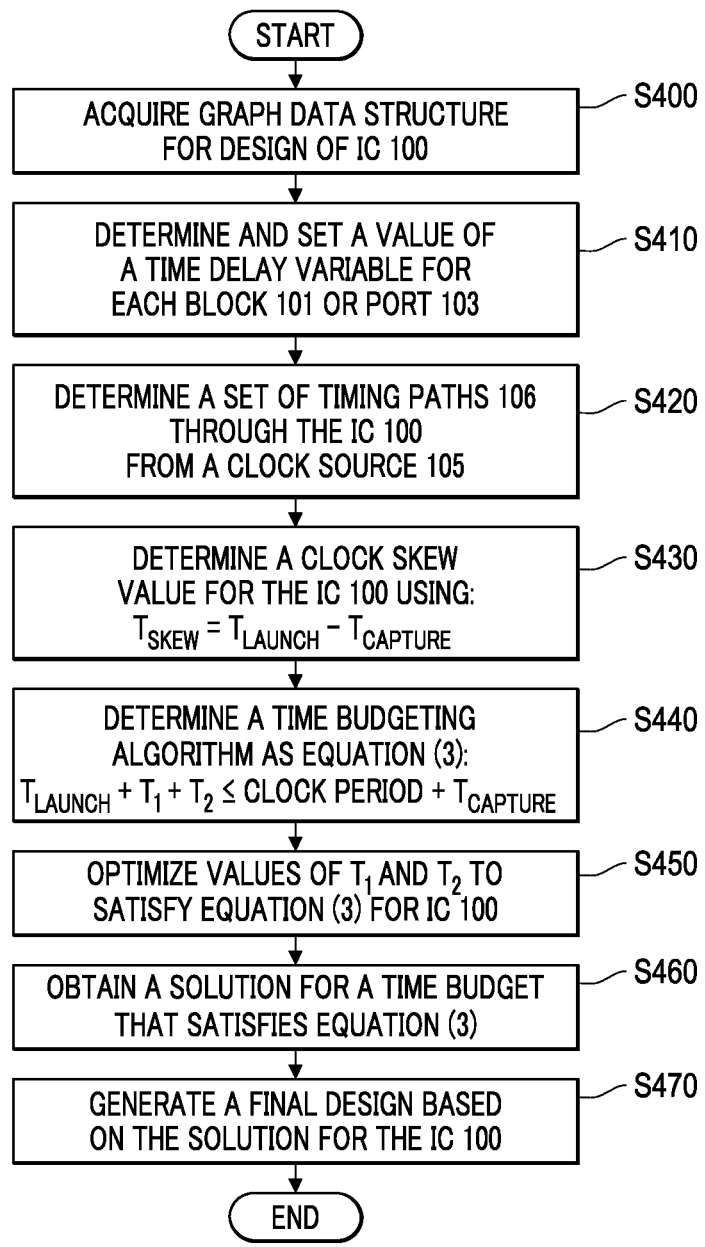
FIG. 4 illustrates a flowchart of exemplary processes for path-based time budgeting that accounts for clock skew of the full IC according to an exemplary embodiment.

FIG. 4 illustrates a time budgeting process accounting for clock skew (latency) according to an exemplary embodiment. In step S400, a graph data structure of an IC design for IC 100 is acquired based on an initial physical database of the electronic components of the IC 100. FIG. 2 illustrates a simplified example of the graph data structure for IC 100. The graph data structure divides electronic components of the IC design into the plurality of blocks 101. Each of the plurality of blocks 101 corresponding to one of different design modules 102. However, FIG. 2 is not limited to this example of different design modules 102, and instead the design modules 102 of some or all of the plurality of blocks 101 may be identical, as discussed in more detail below in the multi-instantiation section.

In step S410, a value of a time delay variable $T_1/T_2$ is initially determined for each block 101, and/or each port 103 of each block 101, based on values of internal and external delays of the ports 103 and electronic components of each design module 102 corresponding to each of the plurality of blocks 101. The values of the time delay variables $T_1/T_2$ are time delays that are caused by a signal propagating between ports 103 and the electronic components.

If conventional techniques were applied to the example shown in FIG. 2, time budgeting would be performed based on the values of the time delay variables $T_1/T_2$ determined and set for each block 101 using the following Equation (1):

$$T_1 + T_2 \leq \text{Clock Period}$$

In Equation (1), $T_1$ is the time delay variable set for Block 1 and $T_2$ is the time delay variable set for Block 2 along the timing path 106. The Clock Period is the clock period pre-determined for the full IC 100. As discussed herein, the conventional technique employed by Equation (1) can not account for any advanced timing factors because the advanced timing factors are path specific and are only quantified when a timing path is defined/specified, such as by start and end points. Thus, the conventional technique is unable to minimize timing violations, and the exemplary embodiments are an improvement over the conventional technique by using a path-based time budgeting framework.

In step S420 through step S440, the improved time budgeting algorithm of the exemplary embodiments is implemented to improve upon Equation (1) and to reduce the possibility of timing violations.

In step 420, a set of timing paths 106 is determined through the IC 100. The set of timing paths 106 may be determined through one of multiple standards, such as, for example, all timing paths that cross a block boundary, or all timing critical paths that cross a block boundary. Each timing path 106 includes a launch path and a capture path that both start at the clock source 105 and follow different routes through the IC 100 along the timing path 106, and a data path. In the exemplary embodiment shown in FIG. 2, the launch path starts from the clock source 105 to the register (Reg1) 104 and then to register (Reg2) 104, and the capture path starts at the clock source 105 and continues to the register (Reg2) 104.

As discussed above, the time budgeting method of the exemplary embodiments is based on a path-based time budgeting process. A path-based process means that the time budgeting process is applied based on cells or components along the timing path 106 of the IC 100. The timing path 106 is defined by a start point and an end point.

In step S430, a value of at least one advanced timing factor is determined and set for each of the launch path and the capture path of each timing path 106 based on various conditions relating to the IC 100. In the exemplary embodiment of FIG. 4, the advanced timing factor is a clock skew value for each block 101 of the plurality of blocks 101.

The clock skew is produced by a phenomenon in synchronous integrated circuits in which clock signals issued/launched from the same clock source 105 arrives at different components at different times within the IC 100. The instantaneous difference between the readings of the clocks different components is known as clock skew.

In a synchronous integrated circuit, two registers are considered to be "sequentially adjacent" when connected by a timing path. The present exemplary embodiment, as shown in FIG. 2, includes two sequentially adjacent registers 104 (Reg1 and Reg2) with clock arrival times at launch and capture registers equal to $T_{launch}$ and $T_{capture}$ along the launch path and capture path, respectively. A launch register is a register that receives a data signal transmitted (launched) from an external source along the launch path, and a capture register is a register that allows output data to be acquired (captured) by an external source along the capture path. Reg1 104 is the launch register and Reg 2 104 is the capture register.

The clock skew is based on the following Equation (2):

$$T_{skew} = T_{launch} - T_{capture}$$

In step S440, an improved time budgeting algorithm is determined for each timing path 106 that sets forth a time budget for the ports of the plurality of blocks 101 of the full IC 100 along the launch path and the capture path of each timing path 106. The time budgeting algorithm is set forth in Equation (3):

$$T_{launch} + T_1 + T_2 \leq \text{Clock Period} + T_{capture}$$

This improved time budgeting algorithm may also be provided as Equation (4):

$$T_{skew} + T_1 + T_2 \leq \text{Clock Period}$$

In step S440, the improved time budgeting algorithm accounts for clock skew in the time budgeting of the full IC 100. The value of $T_{skew}$ may be either positive or negative.

In step S450, optimization is performed to calculate optimized values of the time delay variable $T_1/T_2$ along each timing path 106. The value of the advanced timing factor (e.g., clock skew) is set and fixed during optimization. Meaning, optimization changes the value of the time delay variables $T_1/T_2$ to satisfy the acquired clock period requirements of the IC 100 and calculate optimized values of the time delay variable $T_1/T_2$ that are as close to the clock period as possible. The value of the advanced timing factor adjusts the clock period, which affects the values of the time delay variables $T_1/T_2$.

In step S460, a solution for the time budget of the time delay variable $T_1$ and the time delay variable $T_2$ is obtained as a result of the optimization performed on the IC 100. The solution is based on the optimized values of the time delay variables $T_1/T_2$ in the time budgeting algorithm that satisfies all of the timing paths 106, which results in satisfying the acquired clock period requirements of the IC 100 while minimizing the possibility of timing violations.

In step S470, a final design of the IC 100 is generated. The final design indicates all parameters of the blocks 101, including the internal and external delays, the timing paths 106, and the physical location of the connected elements of the ports 103 for the IC 100. The final design is output for manufacturing of the IC 100 based on the final design. The outputting may be performed through a variety of methods, such as transmitting to a manufacturing tool, displaying on a display screen, notifying to a user, etc.

In step S480 (not shown), the IC 100 is manufactured according to the outputted final design.

Steps S400 through step S480 are merely exemplary steps of an exemplary embodiment and may include additional steps or sub-steps.

Advanced Timing Factor—Common Path Pessimism Removal (CPPR)

Figure 5:
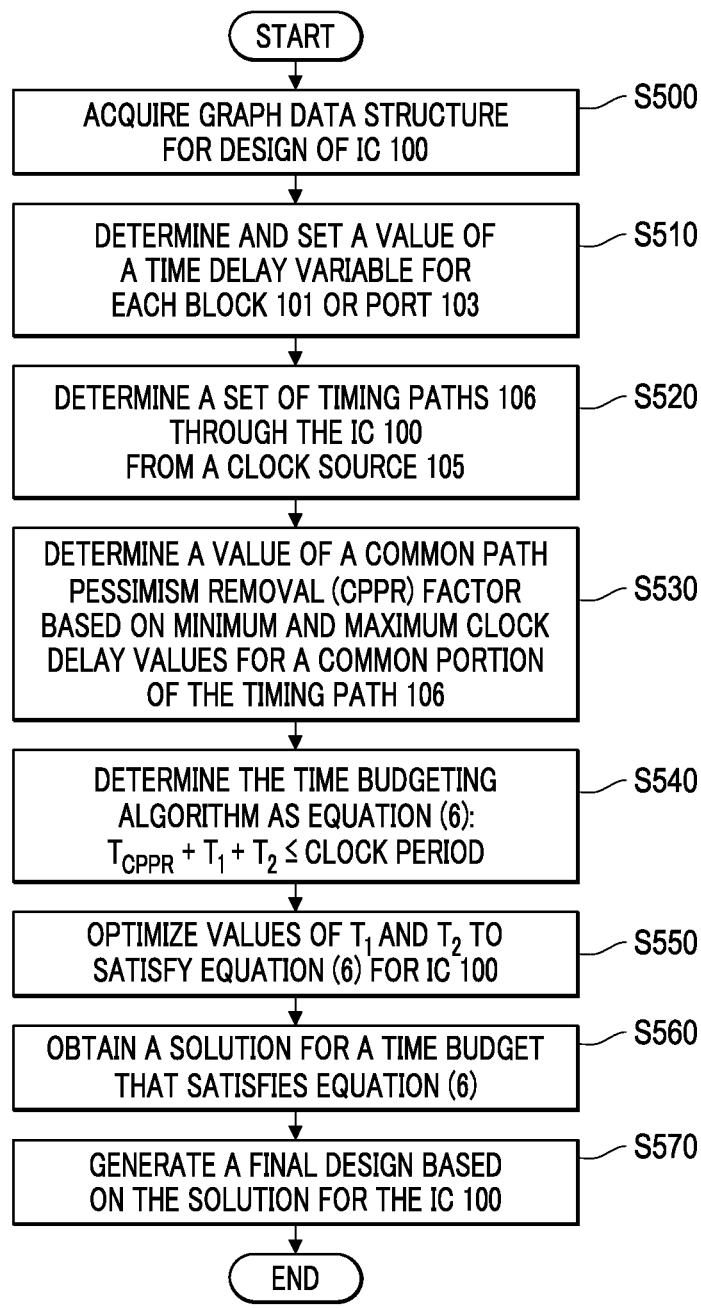
FIG. 5 illustrates a flowchart of exemplary processes for path-based time budgeting that accounts for CPPR of the full IC according to an exemplary embodiment.

FIG. 5 illustrates a time budgeting process accounting for CPPR according to an exemplary embodiment. Step S500 through step S520 are substantially identical to step S400 through step S420, as described in detail above. Thus, for conciseness, the above-description of step S400 through step S420 is not reproduced herein applies equally to step S500 through step S520.

In step S530, a value of at least one advanced timing factor is determined and set. In the exemplary embodiment of FIG. 5, the advanced timing factor is a Common Path Pessimism Removal (CPPR) factor. CPPR is a technique that analyzes the launch path and the capture path of each timing path 106 determined in step S520 and determines points/portions of overlap or commonality between the launch path and the capture path of the timing paths 106.

Each of the launch path and the capture path starts at the clock source 105 and follows different routes through the IC 100. In the exemplary embodiment shown in FIG. 2, the launch path starts from the clock source 105, then to the register (Reg1) 104 of Block 1. The capture path starts at the clock source 105 and continues to the register (Reg2) 104. As shown in FIG. 2, a portion of each of the launch path and the capture path of each timing path 106 follows the same path/portion before diverging—from the clock source to a node where each timing path 106 diverges into the launch path and the capture path. This portion of each timing path 106 is known as a common path.

The value of the CPPR factor is determined based on a difference between a value of the minimum clock delay and a value of the maximum clock delay for the common path. A technique known as common path pessimism provides for setting maximum and minimum delay values for electronic components and portions of a timing path, as discussed below.

In common path pessimism, it is known that manufacturing limitations result in the same component having different delays and output transition times at different locations and different instances of time despite being identical in design. This is known as on-chip variation. Typically, on-chip variation for a component is determined using path derating factors that provide a percentage variation by which the clock delay of the components changes due to on-chip variation. On-chip variation provides for two extremes of the variations—a late/slowest delay model and early/fastest delay model for each component.

For example, on-chip variation timing minimizes all the timing parameters that improve/decrease the delay by using early/fast models and maximizes all the timing parameters that degrade/increase the delay by using the late/slow model. This type of modeling ensures robustness through manufacturing as both the extremes are analyzed simultaneously under a worst case scenario.

The CPPR technique removes the on-chip variation minimum and maximum values from the time budget for each timing path. Meaning, for the common path portion of each timing path 106, the CPPR factor is implemented to remove the minimum and maximum delay values from the time budgeting algorithm. This results in the delay being set as an average or median value for the delay in the common path portion of the timing path 106.

In step S540, an improved time budgeting algorithm is determined that sets the value of the CPPR factor as $T_{CPPR}$ (Reg1$_{launch}$, Reg2$_{capture}$). The CPPR factor of the exemplary embodiment is represented by the following Equation (5):

$$T_{CPPR}(Reg1_{launch}, Reg2_{capture}) + T_1 + T_2 \leq \text{Clock Period}$$

This improved time budgeting algorithm may also be provided as Equation (6):

$$T_{CPPR} + T_1 + T_2 \leq \text{Clock Period}$$

Step S550 through step S580 are substantially identical to step S450 through step S480, as described in detail above. Thus, for conciseness, the above-description of step S450 through step S480 is not reproduced herein and applies equally to step S550 through step S580.

Advanced Timing Factor—Data Cell Variation

Figure 6:
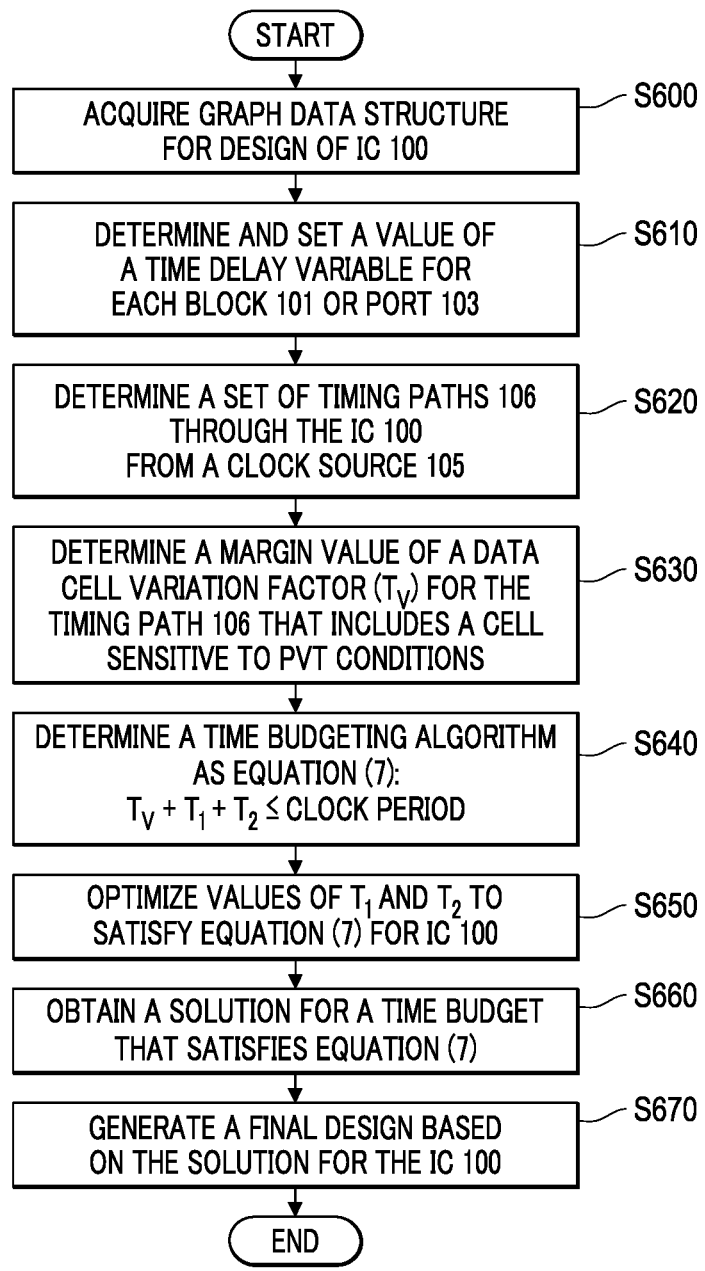
FIG. 6 illustrates a flowchart of exemplary processes for path-based time budgeting that accounts for data cell variation of the full IC according to an exemplary embodiment.

FIG. 6 illustrates a time budgeting process accounting for data cell variation according to an exemplary embodiment. Step S600 through step S620 are substantially identical to step S400 through step S420, as described in detail above. Thus, for conciseness, the above-description of step S400 through step S420 is not reproduced herein applies equally to step S600 through step S620.

In step S630, a value of at least one advanced timing factor is determined and set. In the exemplary embodiment of FIG. 6, the advanced timing factor is known as data cell variation value. Data cell variation is a technique that accounts for a change in the timing performance of different cells (e.g., electronic components, wiring, etc.) of the IC 100 due to varying conditions. For example, under different process conditions, environmental conditions (e.g., temperature) or voltage conditions, certain cells (e.g., electronic components) of the IC 100 may have an increased or decreased timing delay. This is known as PVT (Process-Voltage-Temperature) conditions for on-chip variation. The PVT conditions are also known as corners.

In the exemplary embodiments, a margin value of data cell variation is determined and set for each timing path 106, which includes at least one cell that is sensitive to change in the timing performance. The margin value of the data cell variation is determined using various methods. For example, the margin value may be calculated based on the number of data variation sensitive cells and a degree of sensitivity of the data variation sensitive cells.

For example, transistors are sensitive to process variations, which are variations or imperfections in the manufacturing of the transistor. Possible variations of a transistor may include channel length, oxide thickness, doping concentration, metal thickness, etc. Changes or variations in these physical properties of the transistor cause a change in the current flowing through the transistor, which results in a change in the clock delay timing. For example, as the process condition decreases (i.e., the amount of imperfection increases) and the amount of current that is able to flow through the data cell (e.g., transistor) decreases, the clock delay increases.

For voltage variation, a supply of the voltage from a power supply or from the clock source 105 may vary during operation of the IC 100. A change in supply voltage may be caused by, for example, current flow through a parasitic power grid or circuit, and/or supply noise that is caused by parasitic inductance in combination with the resistance and capacitance of the power grid or circuit. In general, as the supply voltage increases, the clock delay decreases, and vice versa.

For temperature variation, a temperature of the environment in which the IC 100 is operating may change over time. For example, in general, as the temperature increases, the clock delay also increases. However, in certain circumstances this may change due to temperature inversion, which is a known phenomenon.

The margin value of the data cell variation factor is determined as a percentage value above and below the delay of the component(s) that are data variation sensitive cells. The degree of sensitivity is used to determine the percentage value, which is then multiplied by the number of data variation sensitive cells.

In step S640, an improved time budgeting algorithm is determined that sets the margin value of the data cell variation factor as $T_V$. The margin value of the data cell variation factor is determined for the cells along each timing path 106. The data cell variation factor of the present exemplary embodiment is represented in the following Equation (7):

$$T_V + T_1 + T_2 \leq \text{Clock Period}$$

Step S650 through step S680 are substantially identical to step S450 through step S480, as described in detail above. Thus, for conciseness, the above-description of step S450 through step S480 is not reproduced herein and applies equally to step S650 through step S680.

Advanced Timing Factor—Signal Integrity (SI)

Figure 7:
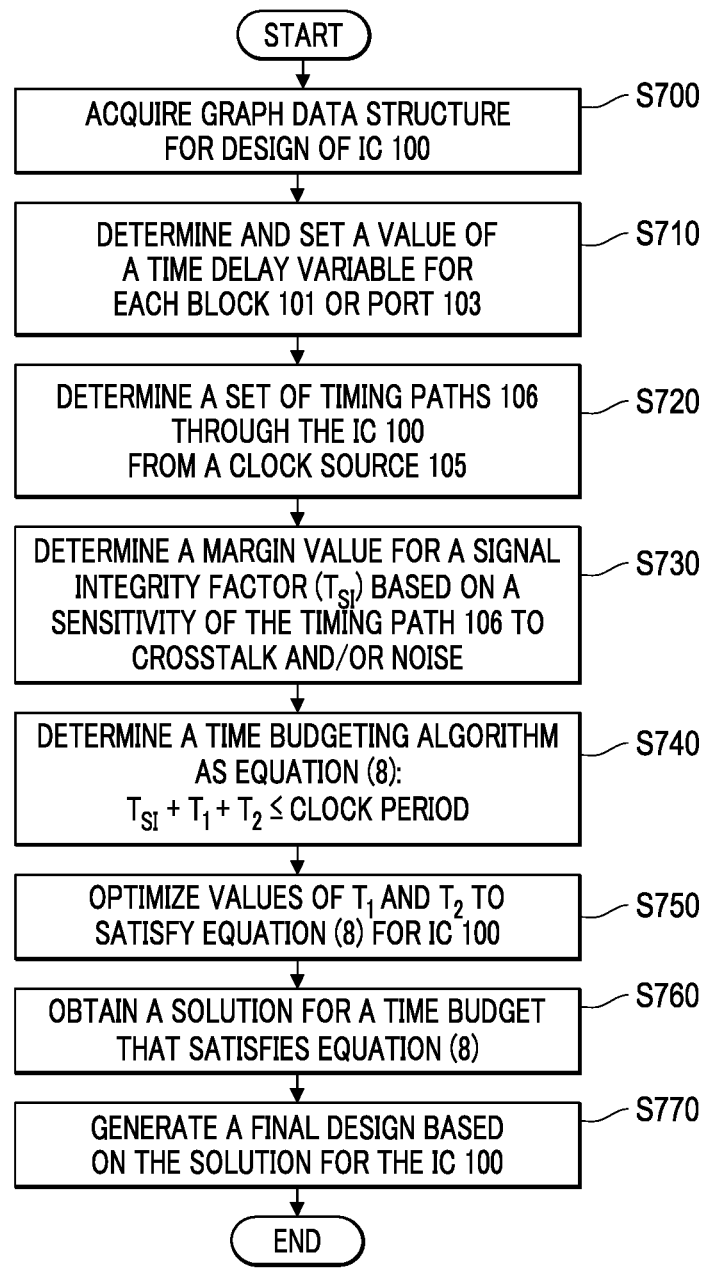
FIG. 7 illustrates a flowchart of exemplary processes for path-based time budgeting that accounts for signal integrity of the full IC according to an exemplary embodiment.

FIG. 7 illustrates a time budgeting process accounting for signal integrity (SI) according to an exemplary embodiment.

Step S700 through step S720 are substantially identical to step S400 through step S420, as described in detail above. Thus, for conciseness, the above-description of step S400 through step S420 is not reproduced herein applies equally to step S700 through step S720.

In step S730, a value of at least one advanced timing factor is determined and set. In the exemplary embodiment of FIG. 4, the advanced timing factor is a signal integrity factor of one or more of the wires and/or electronic components along each timing paths 106 that are determined to be sensitive to crosstalk. Similar to the data cell variation factor, the signal intensity factor is also accounted for by a margin value, as discussed in more detail below.

Crosstalk and noise are phenomena that are caused by coupling capacitance, mutual inductance, substrate coupling, non-ideal gate operation, etc. between metal wires in an IC. In other words, a signal passing through one wire can cause electrical interference that affects another wire in proximity. This effect of crosstalk and noise increases as the size of ICs decrease. Crosstalk may result in malfunctions, reduced operation speed, or complete failure of the IC.

The signal integrity factor adds a margin value that is increased, for example, when a cell (e.g., electronic component) is less tolerant to the crosstalk and noise, when wires are located in a congested block and have potential aggressor in its timing window, and/or when there are parallel structures that could accumulate for the SI effects.

In step S740, an improved time budgeting algorithm is determined that sets the margin value of the signal integrity factor as $T_{SI}$. The margin value of the signal integrity factor is determined based on the sensitivity of each timing path 106 to crosstalk and/or noise. The signal integrity factor of the present exemplary embodiment is represented in the following Equation (8):

$$T_{SI}+T_1+T_2 \leq \text{Clock Period}$$

Step S750 through step S780 are substantially identical to step S450 through step S480, as described in detail above. Thus, for conciseness, the above-description of step S450 through step S480 is not reproduced herein and applies equally to step S750 through step S780.

Multi-Instantiation

In another exemplary embodiment, the full IC 100 may have multiple design modules 102 that are identical in different blocks 101, which is known as multi-instantiation. Any and all of the embodiments discussed herein may be implemented as described when the IC 100 includes multi-instantiation of at least one design module 102. Although not shown in FIG. 2, in the event that the IC 100 includes multiple blocks 101 that have an identical design module 102, this would be considered a multi-instantiation of the design module 102.

When each timing path 106 crosses between and across blocks 101 having the same design module 102, the effects of the above-described advanced timing factors are affected. For example, the values of the advanced timing factors may be multiplied based on the number of multi-instantiated blocks in order to compensate for the multi-instantiation for the design modules 102 along each timing path 106. Alternatively, the time delay variables may be weighted or multiplied to provide a more conservative time budget. As another alternative, time delay variables may be disproportionately changed or weighted for the blocks 101 that have the same design module 102 along each timing path 106.

Any and/or all of the advanced timing factors may be applied as described herein for multi-instantiation within the IC 100.

The method(s) of the exemplary embodiments may include fewer or additional steps than the exemplary embodiments set forth herein. In addition, the different advanced timing factors may be considered individually or combined depending on the applicable advanced timing factors for a particular IC 100.

Time Budgeting Device 110

As shown in FIG. 1, the time budgeting device 110 may be configured as one or more computers including one or more processors 120, one or more storage devices 130, and an input/output (I/O) interface 140. The one or more processors 120 and the one or more storage devices 130 of the time budgeting device 110 perform at least the same functions as the above-mentioned method.

The above description of the method also applies to the following exemplary embodiments of the time budgeting device 110, which will also be discussed in detail below.

The one or more processors 120 acquire a graph data structure of an IC design for IC 100. The one or more processors 120 initially determine a value of the time delay variables $T_1/T_2$ for each block 101, and/or each port 103 of each block 101, based on values of internal and external delays of the ports 103 and electronic components of the different design modules 102 corresponding to each of the plurality of blocks 101.

The one or more processors 120 determine each timing path 106 through the IC 100, which is divided into three paths: (i) a launch path extending from a clock source 105 to Block 1, (ii) a capture path extending from the clock source 105 to Block 2, and (iii) a data path extending between a register (Reg1) 104 of Block 1 and a register (Reg2) 104 of Block 2.

The one or more processors 120 implement a path-based time budgeting process that is applied to each timing path 106 of the IC 100. In the exemplary embodiment shown in FIG. 2, the launch path and the capture path of the timing path 106 each share a common start point—clock source 105.

The one or more processors 120 then determine and set a value of at least one advanced timing factor. In the exemplary embodiments of FIG. 4-7, the advanced timing factor may be, for example, a clock skew value, common path pessimism removal (CPPR) factor, a data cell variation value, signal integrity (SI) factor, etc. Each of the exemplary advanced timing factors will be discussed in more detail below.

In response to determining an improved time budgeting algorithm that incorporates one or more of the advanced timing factors, the one or more processors 120 perform optimization of the values of the time delay variable $T_1/T_2$ to calculate optimized values of the time delay variable $T_1/T_2$ along each timing path 106. The value of the advanced timing factor (e.g., clock skew) is set and fixed during optimization. Meaning, optimization changes the value of the time delay variables $T_1/T_2$ to satisfy the acquired clock period requirements of the IC 100 and calculate optimized values of the time delay variable $T_1/T_2$ that are as close to the clock period as possible. The value of the advanced timing factor adjusts the clock period, which affects the values of the time delay variables $T_1/T_2$.

A solution for the time budget of the time delay variable $T_1$ and the time delay variable $T_2$ of Block 2 is obtained as a result of the optimization performed on the IC 100. The solution is based on the optimized values of the time delay variables $T_1/T_2$ in the time budgeting algorithm that satisfy all of the timing paths 106, which result in satisfying the acquired clock period requirements of the IC 100 while minimizing the possibility of timing violations. Using the solution for the time budget, a final design of the IC 100 is generated by the one or more processors 120. The final design indicates all parameters of the blocks 101, including the internal and external delays, the timing paths 106, and the physical location of the connected elements of the ports 103 for the IC 100. The final design is output for manufacturing of the IC 100 based on the final design. The outputting may be performed through a variety of methods, such as transmitting to a manufacturing tool, displaying on a display screen, notifying to a user, etc. The IC 100 is manufactured according to the outputted final design.

The above description of the advanced timing factors with respect to the exemplary methods applies to the advanced timing factors of the time budgeting device 110. For completeness, the advanced timing factors with respect to the processes and function performed by the time budgeting device 110 will now be individually described.

Advanced Timing Factor—Clock Skew

Clock skew is an instantaneous difference between the readings of the clocks at different components that are produced by a phenomenon in synchronous integrated circuits in which clock signals issued/launched from the same clock source 105 arrives at different components at different times within the IC 100.

The exemplary embodiment shown in FIG. 2 includes two sequentially adjacent registers 104 (Reg1 and Reg2) with clock arrival times at launch and capture registers equal to $T_{launch}$ and $T_{capture}$ along the launch path and the capture path of each timing path 106, respectively. The clock skew is based on Equation (2), described above.

The one or more processors 120 determine an improved time budgeting algorithm for a time budget for the ports 103 of the plurality of blocks 101 of the full IC 100 along the launch path and capture path of each timing path 106, which is implemented by Equations (3) and (4), as described above. The value of $T_{skew}$ may be either positive or negative. The improved time budgeting algorithm accounts for clock skew in the time budgeting of the full IC 100 along the timing path 106, which results in minimizing the possibility of timing violations.

Advanced Timing Factor—Common Path Pessimism Removal (CPPR)

The one or more processors 120 determine time budgeting algorithm that accounts for CPPR, which is a technique that analyzes the launch path and the capture path of each timing path 106 determined in step S520 and determines points of overlap or commonality between the launch path and the capture path of each timing path 106.

Each of the launch path and the capture path of each timing path 106 starts at the clock source 105 and follows different routes through the IC 100. In the exemplary embodiment shown in FIG. 2, a portion of the launch path and the capture path follows the same path (i.e., a common path)—from the clock source to a node where the launch path and the capture path of the timing path 106 diverge.

The value of the CPPR factor is determined based on a difference between a value of the minimum clock delay and a value of the maximum clock delay for the common path. The technique known as common path pessimism provides for setting maximum and minimum delay values for electronic components and portions of a timing path, as discussed above. In common path pessimism, the on-chip variation for a component is determined using path derating factors that provide a percentage variation by which the clock delay of the components changes due to on-chip variation. On-chip variation provides for the two extremes in the variations of a late/slowest delay model and early/fastest delay model for each component.

For the common path portion of the timing path 106, the CPPR factor is implemented to remove the minimum and maximum delay values from the time budgeting algorithm. This results in the clock delay being set as an average or median value for the delay in the common path portion of the timing path 106.

The one or more processors 120 determine an improved time budgeting algorithm that sets the value of the CPPR factor as $T_{CPPR}$ (Reg1$_{launch}$, Reg2$_{capture}$). The CPPR factor of the present exemplary embodiment is represented by Equations (5) and (6), as described above.

Advanced Timing Factor—Data Cell Variation

The one or more processors 120 determine a margin value of the data cell variation factor, which accounts for a change in the timing performance of different cells (e.g., electronic components, wiring, etc.) along each timing path 106 of the IC 100 due to varying conditions, such as process conditions, environmental conditions (e.g., temperature), or voltage conditions. Under the different conditions, certain cells (e.g., electronic components) along each timing path 106 of the IC 100 may have an increased or decreased timing delay. This is also known as PVT (Process-Voltage-Temperature) conditions or corners for on-chip variation.

The one or more processors 120 determine and set the margin value of the data cell variation factor for each timing path 106 that includes at least one cell that is sensitive to change in the timing performance. For example, transistors are sensitive to process variations, which are variations or imperfections in the manufacturing of the transistor. Possible variations of a transistor may include channel length, oxide thickness, doping concentration, metal thickness, etc.

For process variation, as the process condition decreases (i.e., the amount of imperfection increases) and the amount of current that is able to flow through the data cell (e.g., transistor) decreases, the clock delay increases.

For voltage variation, a supply of the voltage from a power supply or from the clock source 105 may vary during operation of the IC 100. A change in supply voltage may be caused by, for example, current flow through a parasitic power grid or circuit, and/or supply noise that is caused by parasitic inductance in combination with the resistance and capacitance of the power grid or circuit. In general, as the supply voltage increases, the clock delay decreases, and vice versa.

For temperature variation, a temperature of the environment in which the IC 100 is operating may change over time. For example, in general, as the temperature increases, the clock delay also increases. However, in certain circumstances this may change due to temperature inversion.

For example, the margin value of the data cell variation factor is determined as a percentage value above and below the clock delay of the component(s) that are data variation sensitive cells along the timing path 106. The degree of sensitivity is used to determine the percentage value, which is then multiplied by the number of data variation sensitive cells.

The improved time budgeting algorithm for each timing path 106 sets the value of the data cell variation factor as $T_V$ and determines the data cell variation factor for each timing path 106. The data cell variation factor of the present exemplary embodiment is represented by Equation (7), as described above.

Advanced Timing Factor—Signal Integrity (SI)

The one or more processors 120 determine a margin value of the signal integrity factor of one or more of the wires, and/or electronic components, along each timing path 106 that are determined to be sensitive to crosstalk and/or noise. Crosstalk and noise are caused by a signal passing through one wire causing electrical interference that affects another wire in proximity. Crosstalk and noise may result in malfunctions, reduced operation speed, or complete failure of the IC 100.

As discussed above, the signal integrity factor adds a margin value that is increased, for example, when a cell (e.g., electronic component) is less tolerant to the crosstalk and noise, when wires are located in a congested block and have potential aggressor in its timing window, and/or when there are parallel structures that could accumulate for the SI effects.

The one or more processors 120 determine the improved time budgeting algorithm by setting the margin value of the signal integrity factor as $T_{SI}$, which is determined for each timing path 106. The signal integrity factor of the present exemplary embodiment is represented by Equation (8).

Multi-Instantiation

As discussed above, the full IC 100 may have multiple design modules 102 that are identical in different blocks 101, which is known as multi-instantiation. The time budgeting device 110 may implement any and all of the embodiments discussed herein when the IC 100 includes multi-instantiation of at least one design module 102. Although not shown in FIG. 2, in the event that the IC 100 includes multiple blocks 101 that have an identical design module 102, this would be considered a multi-instantiation of the design module 102.

When each timing path 106 crosses between and across blocks 101 having the same design module 102, the values of the advanced timing factors may, for example, be multiplied based on the number of multi-instantiated blocks in order to compensate for the multi-instantiation for the design modules 102 along the timing path 106. Alternatively, the time delay variables may be weighted or multiplied to provide a more conservative time budget. As another alternative, time delay variables may be disproportionately changed or weighted for the blocks 101 that have the same design module 102 along each timing path 106.

The above-mentioned embodiments are examples of the methods and devices that achieve the improvements set forth herein. Although the above-mentioned embodiments are disclosed in relation to EDA software, these exemplary embodiments may be applied to other types of software, such as scripts.

The above-mentioned embodiments provide methods and devices that use a top-level/full-chip approach for path dependent time budgeting, such that the exemplary embodiments more accurately determine the time budgeting of the full chip to meet the time period requirements. Importantly, the path-based approach that also accounts for the advanced timing factors in the time budgeting algorithm results in minimizing the likelihood or possibility of full-chip timing violations.

Further, the exemplary embodiments increase the accuracy and efficiency of the design process, and reduce the engineer workloads and computational resource machine (computer) requirements by reducing the amount of post-design modifications to the time budget during a timing analysis phase in light of the increased accuracy of the design developed during the design process. Time budgeting of the blocks in the IC affects the physical design/implementation of the components of the blocks when manufactured. Thus, the more accurate time budgeting performed by the exemplary embodiments during the design process also affects the physical implementation of the blocks when the IC is manufactured.

The invention claimed is:

1. A computer-implemented method of time budgeting an integrated circuit (IC), said computer-implemented method having computer-executable instructions executable by a processor, said computer-implemented method comprising:
   determining an initial value of time delay variables along a specific set of timing paths, said specific set of timing paths is part of each block of a plurality of blocks of the IC, said initial value of time delay variables being based on delays of each design module corresponding to each of the plurality of blocks, wherein the each block corresponds to physical manifestation of the design module on the IC domain;
   determining a value of at least one advanced timing factor adjusting a clock period of the IC along each timing path;
   generating a time budget for ports of the plurality of blocks along each timing path based on the determined value of the at least one advanced timing factor and the initial value of the time delay variable, wherein the time budget is generated based on input and output delay constraints along with path exceptions for a timing closure of the blocks or partitions; and
   optimizing the value of time delay variables by calculating new values of the time delay variables that satisfy each timing path to minimize a possibility of timing violations and to satisfy the clock period of the IC, which is adjusted by the value of the at least one advanced timing factor.

2. The computer-implemented method according to claim 1, further comprising generating a final design for manufacturing of the IC based on the optimized value of time delay variables and the clock period adjusted by the value of at least one advanced timing factor.

3. The computer-implemented method according to claim 1, wherein the at least one advanced timing factor is one of a clock skew value, common path pessimism removal (CPPR) factor, a data cell variation factor, and a signal integrity factor.

4. The computer-implemented method according to claim 3, wherein the timing path includes (i) a launch path that extends from a clock source to a first block of the plurality of blocks, (ii) a capture path that extends from the clock source to the second block of the plurality of blocks, and (iii) a data path.

5. The computer-implemented method according to claim 4, wherein the clock skew value is a difference in timing for a signal transmitted along the launch path as compared to a signal transmitted along the capture path, the clock skew value being summed with a total time delay variable value of the time delay variables along each timing path.

6. The computer-implemented method according to claim 4, wherein:
   a value of the CPPR factor is a difference between a value of a minimum clock delay and a value of a maximum clock delay for a common path, which is common to both the launch path and the capture path of each timing path; and
   the value of the CPPR factor is summed with a total time delay variable value of the time delay variables along each timing path.

7. The computer-implemented method according to claim 3, wherein a margin value of the data cell variation factor is based on a number of data variation sensitive cells along each timing path and a degree of sensitivity of the data variation sensitive cells along each timing path.

8. The computer-implemented method according to claim 3, wherein a margin value of the signal integrity factor is determined based on a sensitivity to crosstalk or noise between wires or components along each timing path.

9. The computer-implemented method according to claim 3, wherein at least two blocks of the plurality of blocks have a design module that is identical to each other, and the value of the at least one advanced timing factor is changed based on the at least two blocks that have identical design modules.

10. A time budgeting device comprising:
a memory; and
a processor operatively coupled with the memory, the processor being programmed to perform:
determining an initial value of time delay variables for each block of a plurality of blocks of an integrated circuit (IC) along a set of timing paths based on delays of each design module corresponding to each of the plurality of blocks, wherein each block corresponds to physical manifestation of the design module on the IC domain;
determining a value of at least one advanced timing factor adjusting a clock period of the IC along each timing path;
generating a time budget for ports along each timing path of the plurality of blocks based on the determined value of the at least one advanced timing factor and the initial value of the time delay variable, said time budget defining a timing relationship between a full chip and the plurality of blocks; wherein the time budget is generated based on input and output delay constraints along with path exceptions for a timing closure of the blocks or partitions; and
optimizing the value of time delay variables by calculating new values of the time delay variables that satisfy each timing path to minimize a possibility of timing violations and to satisfy the clock period of the IC, which is adjusted by the value of the at least one advanced timing factor.

11. A non-transitory computer readable storage medium storing computer-readable instructions that, when executed by a computer, cause the computer to perform steps comprising:
determining an initial value of time delay variables for each block of a plurality of blocks of an integrated circuit (IC) along a set of timing paths based on delays of each design module corresponding to each of the plurality of blocks, wherein each block corresponds to physical manifestation of the design module on the IC domain;
determining a value of at least one advanced timing factor adjusting a clock period of the IC along each timing path;
generating a time budget for ports along each timing path of the plurality of blocks based on the determined value of the at least one advanced timing factor and the initial value of the time delay variable, said time budget defining a timing relationship between a full chip and the plurality of blocks; wherein the time budget is generated based on input and output delay constraints along with path exceptions for a timing closure of the blocks or partitions; and
optimizing the value of time delay variables by calculating new values of the time delay variables that satisfy each timing path to minimize a possibility of timing violations and to satisfy the clock period of the IC, which is adjusted by the value of the at least one advanced timing factor.

\* \* \* \* \*